C. J. MARVIN.
GAS GENERATING APPARATUS.
APPLICATION FILED FEB. 15, 1915.
1,193,465.
Patented Aug. 1, 1916.
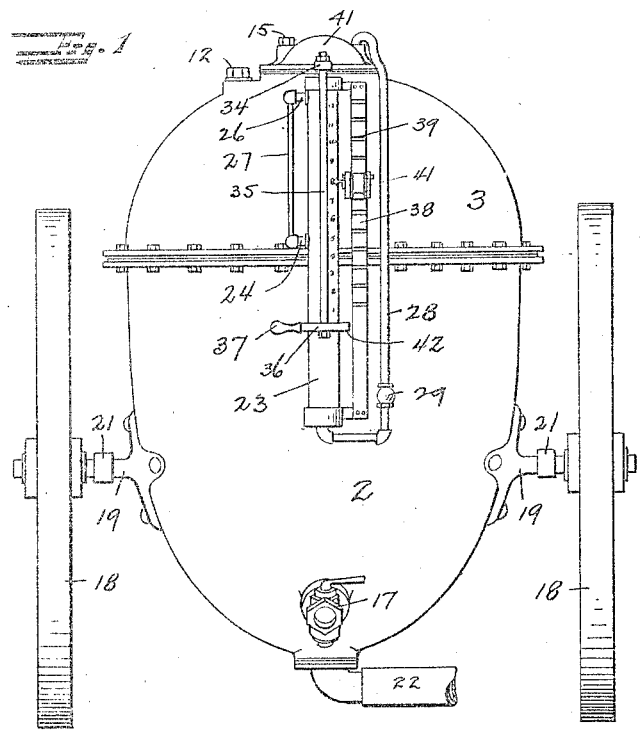
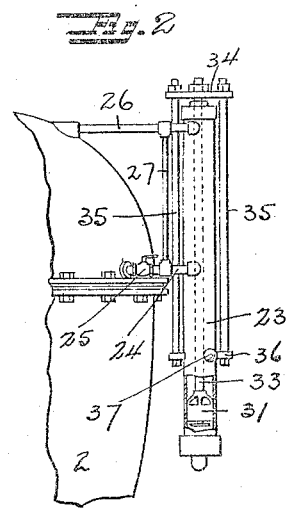
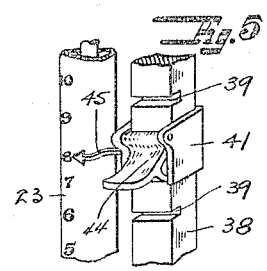
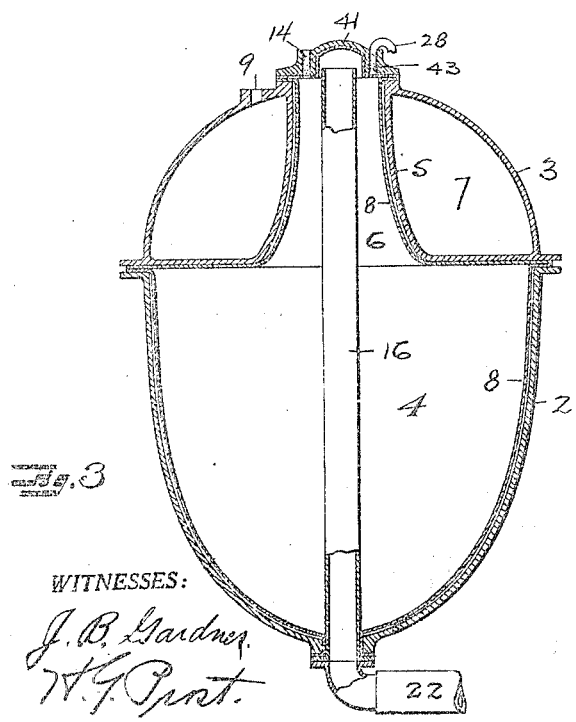
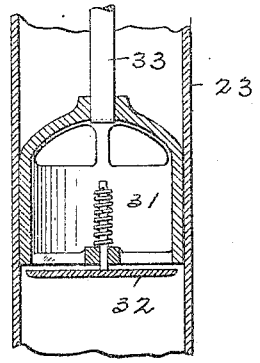
WITNESSES:
J. B. Gardner
H. G. Pint
INVENTOR.
C. J. MARVIN
BY White & Pint
his ATTORNEYS.

UNITED STATES PATENT OFFICE.

CORNELIUS J. MARVIN, OF LOS ANGELES, CALIFORNIA, ASSIGNOR TO THE BRAUN CORPORATION, OF LOS ANGELES, CALIFORNIA, A CORPORATION OF CALIFORNIA.

GAS-GENERATING APPARATUS.

1,193,465.     Specification of Letters Patent.   Patented Aug. 1, 1916.

Application filed February 15, 1915. Serial No. 8,140.

*To all whom it may concern:*

Be it known that I, CORNELIUS J. MARVIN, a citizen of the United States, and a resident of the city of Los Angeles, county of Los Angeles, and State of California, have invented a certain new and useful Gas-Generating Apparatus, of which the following is a specification.

The invention relates to apparatus for generating gas to be used for the fumigation of trees and other purposes.

An object of the invention is to provide a gas generating apparatus of simple and improved construction.

Another object of the invention is to provide a gas generating apparatus by which definite measured quantities of gas may be generated.

A further object of the invention is to provide a generating apparatus which is free from the corrosive action of the reagent employed in generating the gas.

A further object of the invention is to provide an apparatus in which provision is made for preventing the condensation of the generated gas.

The invention possesses other advantageous features, some of which, with the foregoing, will be set forth at length in the following description, where I shall outline in full that form of the invention which I have selected for illustration in the drawings accompanying and forming part of the present specification. In said drawings I have shown only one specific form of my generic invention, but it is to be understood that I do not limit myself to such form, because my invention may be embodied in a multiplicity of forms, each being a species of my said invention. It is also to be understood that by the claims succeeding the description of my invention, I desire to cover the invention in whatever form it may be embodied.

Referring to the said drawings: Figure 1 is an elevation of the generating apparatus of my invention arranged on wheels so that it may be readily transported. Fig. 2 is a side elevation of a portion of the apparatus. Fig. 3 is a vertical section of the generating chamber. Fig. 4 is a detail, in section, of the pump cylinder and piston. Fig. 5 is a detail in perspective of the means for varying and limiting the charge of the reagent employed.

The present apparatus is particularly adapted to be used in the generation of hydrocyanic gas for the fumigation of citrus trees, but it is obvious that it may be employed for the generation of other gases for the same and other purposes. In such tree fumigating operation, the tree is covered with a tent or other suitable covering and an amount of hydrocyanic gas is introduced under the tent. The gas is generated in a portable apparatus removed from the tree and conducted under the tent through a suitable hose or conduit. The hydrocyanic gas is produced by bringing together suitable quantities of sulfuric acid and an alkali metal cyanid, preferably potassium or sodium cyanid or an alkaline earth metal cyanid, preferably calcium cyanid. Heretofore, measured quantities of sulfuric acid and potassium cyanid solution sufficient to produce the desired charge of gas, have been flowed into a receptacle, but great difficulties have been encountered on account of the corrosive action of the acid on the pipes and valves. In accordance with my invention I place a large quantity of sulfuric acid in a receptacle and add thereto successive charges of cyanid solution until the sulfuric acid has been completely exhausted. I also provide positive means for measuring the amount of cyanid solution entered at each charge, so that the proper quantity of gas for the treatment of the particular tree may be generated.

The apparatus of my invention comprises preferably a shell or container formed in two parts 2—3 securely bolted together. The shell is divided interiorly into two chambers or compartments 4 and 7 by the annular wall 5, which also forms a neck or extension 6 of the lower compartment 4. The compartment 4, which constitutes the gas generating chamber, is situated at the lower part of the shell and the annular compartment 7 is arranged at the upper part of the shell and surrounds the neck 6 formed by the upright portion of the wall 5. The compartment 7 is adapted to contain the less corrosive reagent which enters into the gas generating reaction and the compartment 4 contains the more corrosive reagent. Gas is generated in many instances by the reaction of an acid and cyanid or other suitable chemical, and the cyanid is contained in the upper compartment 7 and the acid in the lower compartment, which compartment is provided with a lead lining 8 to protect the shell against the action of the acid. When the apparatus is employed for generating hydrocyanic acid gas, the upper compartment contains alkali metal cyanid or alkaline earth metal cyanid solution and the lower or generating compartment is partly filled with dilute sulfuric acid. The amount of acid placed in the compartment is such that space for the proper generation of the gas is left, when the last charge of cyanid solution is added to the already partially spent liquor in the generating chamber. The neck 6 is closed at the top by a domed cover plate 41 which is provided with bosses having passages 14—43 extending therethrough. These passages are arranged adjacent the sides of the neck for reasons that will be hereinafter explained. The reagent is introduced into the compartment 7 through the aperture 9 which is normally closed by a plug 12 and the other reagent is introduced into compartment 4 through the aperture 14 which is normally closed by a plug 15.

The shell 2 is mounted on wheels 18 so that it may be readily transported, the axles 19 being secured directly to the shell. Secured to the axles are shafts 21 by means of which the apparatus is moved and which also hold the shell normally upright. Arranged on the shell near the bottom is a discharge valve 17 through which the spent liquid in the compartment 4 may be discharged when desired, by opening the valve and tilting the shell. Arranged in the gas generating chamber 4 is a stand pipe 16 preferably formed of hard lead, which registers with the gas discharge outlet at the bottom of the shell. This pipe 16 extends upward above the lower or discharge ends of the passages 14—43, so that none of the material which is introduced through these passages may pass directly into the stand pipe. For this purpose the cover plate 41 is preferably domed. The gas generating reaction is somewhat rapid and as the gas is generated it passes up through the neck 6, down through the stand pipe 16 and through the conduit 22 to the tree or other place where it is to be used. The speed of the gas is quite high during the generation and by abruptly changing the direction of flow of the gas into the stand pipe, the small particles of liquid carried by the gas are separated out. This is a material advantage in hydrocyanic acid gas generation, because on account of the ebullition occasioned by the reaction the gas often carries small particles of sulfuric acid which is injurious to the trees being fumigated. The gas generating reaction produces heat, which warms the shell and the stand pipe, so that the gas is discharged from the apparatus in a heated condition and does not readily condense in the conduit 22. When hydrocyanic acid gas is generated for tree fumigation purposes, the conduit 22 lies on the ground or adjacent the ground, and by discharging the gas from the bottom of the apparatus a much shorter conduit is necessary than if it were discharged from the top and thereby the liability of condensation of the gas in the conduit is greatly lessened.

Means are provided for removing predetermined quantities of the reagent from the chamber 7 and introducing them into chamber 4, where the introduced reagent reacts with the reagent in chamber 4, producing gas which passes out through the pipe 16 and the conduit 22. Mounted on the shell is a pump barrel 23 which is connected intermediate between its ends with the lower part of chamber 7 by means of the pipe 24, in which is arranged the valve 25. The pump barrel is also connected at its upper end to the upper part of the chamber 7 by the pipe 26, which serves as a relief or an overflow pipe, and between the pipes 24 and 26 is arranged a gage glass 27, which indicates the level of the reagent solution in the chamber. From the pump barrel the reagent solution is forced through the pipe 28, provided with the check valve 29, into the upper end of the neck 6 through the passage 43 and consequently into the reagent in chamber 4. The reagent solution is forcibly introduced into the reagent in the chamber, agitating the reagent and preventing a stratification thereof, thereby insuring a perfect and uniform gas generation. The pipe 28 extends upward above the level of the solution in chamber 4 so that the solution cannot siphon over.

Arranged in the pump barrel is a hollow apertured piston 31 provided with a spring held valve 32 which unseats as the piston is moved upwardly. The piston rod 33 extends through the head at the upper end of the pump barrel and is connected to a cross head 34, to which is also connected the guide rods 35 which extend downward along side of the barrel and which are connected at their lower ends to the ring 36 slidably engaging the outer surface of the barrel. Secured to the ring 36 is a handle 37 by means of which the piston is reciprocated in the barrel.

Arranged adjacent the pump barrel and parallel thereto is a bar 38 having a plurality of transverse grooves 39 therein, the grooves being preferably regularly spaced and being marked to indicate certain definite amounts of reagent, in the present instance ounces of solid cyanid. Engaging the bar 38 is a slide 41, which is provided with a latch 44 which is movable into a groove 39, to lock the slide in any desired position. Secured to the slide is an indicator 45 which points to the amount of the charge when the slide is locked in engagement with a groove. The side of the slide lies in the path of movement of the projection 42 on the ring 36 and the slide prevents the piston from being raised past the position indicated by the slide. In the present instance, Fig. 1, the slide is locked in the groove corresponding to "8" on the scale, thereby limiting the upward movement of the piston so that a charge equivalent to eight ounces of solid cyanid is contained in the barrel below the piston, that is, the charge of solution contains eight ounces of cyanid. When the handle is depressed, the charge is forced into the generating chamber 4, causing a definite amount of gas to be formed.

The charges of reagent from chamber 7 are introduced successively, as successive volumes of gas are needed, until all of the supply of reagent originally contained in the generating chamber 4 has been exhausted, after which the valve 17 is opened and the shell tipped to discharge the spent liquor. The valve is then closed and another supply of the reagent is introduced into the chamber 4.

I claim:

1. A gas generating apparatus comprising a receptacle containing two separated storage chambers, each adapted to contain a different reagent, means for removing and measuring a definite quantity of reagent from one chamber and introducing it into the second chamber, the reaction between the introduced reagent and a portion of the reagent in the second chamber causing the generation of gas, and an outlet in said second chamber for said gas.

2. A gas generating apparatus comprising a chamber adapted to contain a quantity of acid, a second chamber adapted to contain a quantity of reagent solution and a pump connected at its intake side to said solution containing chamber and at its discharge side to said acid containing chamber whereby charges of solution may be drawn from said solution containing chamber and introduced into said acid containing chamber into contact with the acid, and a gas outlet to said acid containing chamber.

3. A gas generating apparatus comprising a chamber adapted to contain a reagent, a second chamber adapted to contain another reagent, and means for withdrawing successive predetermined charges of reagent from one chamber and introducing said charges into the other chamber.

4. A gas generating apparatus comprising a chamber adapted to contain a quantity of reagent, a second chamber adapted to contain a quantity of liquid reagent, a pump connected at its intake side to said liquid reagent containing chamber and at its discharge side to said first chamber and means for varying and limiting the stroke of said pump whereby different predetermined amounts of the liquid reagent may be introduced into said first chamber.

5. A gas generating apparatus comprising a chamber adapted to contain a reagent, a second chamber adapted to contain another reagent, a pump barrel connected at its intake side to said second chamber and at its discharge side to said first chamber, a piston in said barrel, a bar arranged adjacent said barrel, and adjustable means on said bar for limiting the stroke of the piston.

6. A gas generating apparatus comprising a chamber adapted to contain a reagent, a second chamber adapted to contain another reagent, a pump barrel connected at its intake side to said second chamber and at its discharge side to said first chamber, a piston in said barrel, means for reciprocating said piston, and means arranged adjacent to said pump barrel for limiting the movement of said piston to a predetermined stroke of less length than the full possible stroke of the piston.

7. A gas generating apparatus comprising a chamber adapted to contain a reagent, a second chamber adapted to contain another reagent, a pump barrel connected at its intake side with said second chamber and at its discharge side with said first chamber, a valved piston in said pump barrel, a rod connected to said piston and arranged externally of said barrel, a projection on said rod, means for reciprocating said rod, a bar arranged parallel to said barrel provided with a plurality of spaced transverse grooves, a slide engaging said bar, means on said slide for engaging one of said grooves and locking the slide in position, said slide lying in the path of said projection.

8. In a gas generating apparatus, a gas generating chamber having an upstanding neck of constricted area and a stand pipe discharging at its lower end exteriorly of said chamber arranged in said chamber and extending into said neck.

9. In a gas generating apparatus, a gas generating chamber, a passage for introducing a reagent into said chamber and a stand pipe discharging from the chamber at its lower end arranged in said chamber and opening into said chamber above the outlet of said passage.

10. In a gas generating apparatus, a gas generating chamber having an upstanding neck, a plate closing said neck at the upper end, a passage through said plate for the introduction of a reagent into said chamber, a stand pipe discharging from said chamber at the lower end arranged in said chamber and opening into said neck above the outlet of said passage.

11. A gas generating apparatus comprising a receptacle adapted to contain a reagent, an annular chamber formed in the upper part of said receptacle adapted to contain another reagent, the inner wall of said annular chamber forming a gas passage from said receptacle, and means for conveying predetermined charges of reagent from said annular chamber to said receptacle.

12. A gas generating apparatus comprising a receptacle adapted to contain a reagent, a neck on said receptacle, an annular chamber surrounding said neck adapted to contain a liquid reagent, a conductor connected to the lower part of said annular chamber and extending above the level of the liquid in said chamber and passing into said neck, a pump arranged in said conductor adapted to measure and force charges of said liquid into said receptacle, and a gas outlet at the upper end of said neck.

13. A gas generating apparatus comprising a chamber adapted to contain a quantity of reagent and means for forcibly introducing a charge of another reagent into said chamber whereby the reagent in said chamber is agitated.

14. A gas generating apparatus comprising a chamber adapted to contain a quantity of a reagent, a second chamber adapted to contain another reagent and means for withdrawing successive charges of reagent from one chamber and forcibly introducing them into the reagent in the other chamber.

15. A gas generating apparatus, comprising a storage chamber adapted to contain a reagent, a second closed storage chamber having a constricted outlet and adapted to contain another reagent, a measuring chamber in communication with both of said first and second chambers whereby successive predetermined charges of reagent from the first chamber may be introduced into said second chamber.

In testimony whereof, I have hereunto set my hand at Los Angeles, California, this 6th day of February 1915.

CORNELIUS J. MARVIN.

In presence of—
WM. KENNEDY,
H. D. MACKINNON.